United States Patent
Kim et al.

(10) Patent No.: US 12,046,052 B2
(45) Date of Patent: Jul. 23, 2024

(54) METHOD FOR DETECTING LANE LINE USING LIDAR SENSOR AND LANE DETECTION DEVICE FOR PERFORMING THE METHOD

(71) Applicant: Vueron Technology Co., Ltd, Seoul (KR)

(72) Inventors: Jaekwang Kim, Bucheon-si (KR); Seungyong Lee, Goyang-si (KR)

(73) Assignee: Vueron Technology Co., Ltd, Seoul (KR)

( * ) Notice: Subject to any disclaimer, the term of this patent is extended or adjusted under 35 U.S.C. 154(b) by 346 days.

(21) Appl. No.: 17/462,365

(22) Filed: Aug. 31, 2021

(65) Prior Publication Data
US 2022/0414386 A1    Dec. 29, 2022

(30) Foreign Application Priority Data
Jun. 28, 2021 (KR) .......................... 10-2021-0084217

(51) Int. Cl.
*G06V 20/56*    (2022.01)
*G01S 17/931*   (2020.01)

(52) U.S. Cl.
CPC .......... G06V 20/588 (2022.01); G01S 17/931 (2020.01)

(58) Field of Classification Search
CPC ............................ G06V 20/588; G01S 17/931
See application file for complete search history.

(56) References Cited

U.S. PATENT DOCUMENTS

| | | | |
|---|---|---|---|
| 2016/0086052 A1* | 3/2016 | Piekniewski | G06T 7/292 382/103 |
| 2020/0074189 A1* | 3/2020 | Xie | G06V 20/588 |
| 2022/0041179 A1* | 2/2022 | Anabuki | G06V 20/56 |
| 2022/0153297 A1* | 5/2022 | Chen | G01S 17/34 |
| 2022/0169281 A1* | 6/2022 | Lin | G06V 20/588 |
| 2023/0111364 A1* | 4/2023 | Chun | G01S 7/4808 382/100 |

(Continued)

FOREIGN PATENT DOCUMENTS

| | | |
|---|---|---|
| CN | 115375956 A * | 11/2022 |
| JP | 2005-100000 A | 4/2005 |

(Continued)

OTHER PUBLICATIONS

Office Action issued on Apr. 20, 2022, in connection with corresponding Korean Patent Application No. 10-2021-0084217; 4 pages.

(Continued)

*Primary Examiner* — Behrang Badii
*Assistant Examiner* — Jay Khandpur
(74) *Attorney, Agent, or Firm* — Bridgeway IP Law Group, PLLC; Jihun Kim

(57) ABSTRACT

A method for detecting a lane line of a lane on a road using a lane detection device is provided. The method includes obtaining, from a lidar sensor, point data by scanning the surroundings of the lidar sensor, detecting one or more lane line points constituting the lane line from among a plurality of points included in the point data using a threshold set based on a driving situation of a driving vehicle equipped with the lane detection device, and detecting the lane line using the one or more lane line points.

17 Claims, 10 Drawing Sheets

(56) References Cited

U.S. PATENT DOCUMENTS

2023/0294700 A1* 9/2023 Omagari .............. G06V 20/588
                                                        701/41

FOREIGN PATENT DOCUMENTS

| JP | 2018-173749 A | 11/2018 |
| JP | 2020-026985 A | 2/2020 |
| KR | 10-1868898 B1 | 6/2018 |
| KR | 10-2083909 B1 | 3/2020 |

OTHER PUBLICATIONS

Huang et al., "Real-Time Road Curb and Lane Detection for Autonomous Driving Using LiDAR Point Clouds", Preparation of Papers for IEEE Access, 2017; 12 pages.
Ghallabi et al., "LIDAR-Based Lane Marking Detection for Vehicle Positioning in an HD Map". 2018 21st International Conference on Intelligent Transportation Systems (Nov. 4-7, 2018); 6 pages.
Li et al., "Lane Marking Quality Assessment for Autonomous Driving". 2018 IEEE/RSJ International Conference on Intelligent Robots and Systems (IROS) (Oct. 1-5, 2018); 6 pages.
Kim et al., "Research on Lane Detection using LiDAR Sensor for LKAS", The Korean Society of Automotive Engineers; (Nov. 2019), 5 pages with English Translation.

* cited by examiner

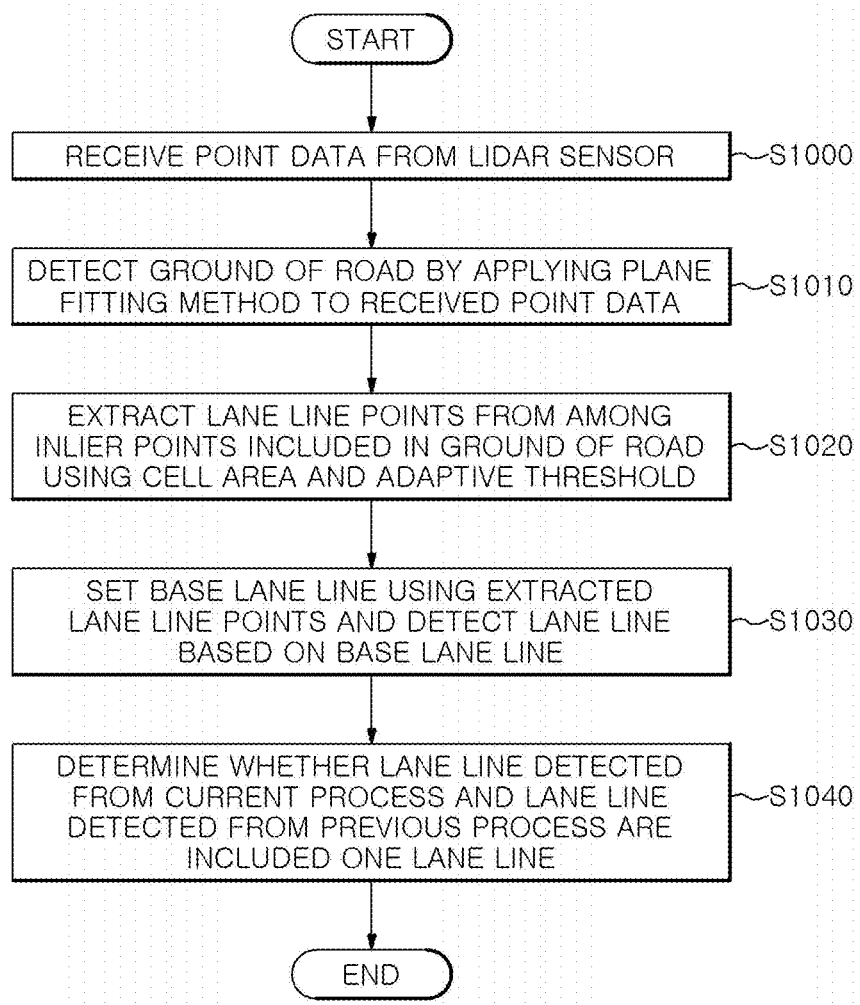

METHOD FOR DETECTING LANE LINE USING LIDAR SENSOR AND LANE DETECTION DEVICE FOR PERFORMING THE METHOD

CROSS-REFERENCE TO RELATED APPLICATION

This application claims priority to Korean Patent Application No. 10-2021-0084217, filed on Jun. 28, 2021. The entire contents of the application on which the priority is based are incorporated herein by reference.

TECHNICAL FIELD

The present disclosure relates to a method for detecting lane lines of a lane on a road using a lidar sensor and a lane detection device for performing the method.

BACKGROUND

Light detection and ranging (Lidar) is a method for determining ranges (variable distance) by measuring the time for a reflected laser beam from a target object to return to the receiver using a high-power pulsed laser. Lidar is used for various fields such as autonomous cars, earth environment monitoring, air quality analysis, and unmanned aerial vehicles. Since the state-of-the-art laser scanners and 3D image cameras for 3D reverse engineering, autonomous driving, and unmanned vehicles use the LiDAR technology, the utility and importance of the LiDAR are increasing gradually.

In order to achieve an autonomous driving, it is necessary to determine (perceive) the vehicle's position accurately and precisely. Currently, GPS sensors are commonly used to determine the vehicle's position; however, for the autonomous driving, a vehicle's position should be determined within an error of a few centimeters, which necessitates a more precise and accurate measurement of the vehicle's position.

To detect the vehicle's position more accurately, it is a common practice to fuse and complement the information detected using sensors installed in the vehicle such as an inertial measurement device or an odometer and the information detected using sensors installed external to the vehicle, such as GPS, lidar, camera, and radar. These sensors installed external to the vehicle may extract feature information of a road such as building walls, guardrails, lane lines of a lane, landmarks, and traffic lights. Then, the extracted information is used to estimate the accurate position of the vehicle along with a high definition map (HD map).

Among the information related to the position of the vehicle, lane line information is particularly abundant more than other road-related feature information, which is the most accurate information available to estimate the lateral position of the vehicle within a lane. Therefore, a precise lane line detection result may help improve the performance of precise positioning.

Problems of Lane Line Detection Methods Using Other Sensors

Currently, cameras are the only sensor for detecting lane lines of a lane on a road. However, cameras show severe performance degradation due to sudden illumination changes and hardly provide accurate range information. In other words, it is difficult for a camera sensor to derive an accurate lane line detection result when there is a sudden change in illumination as observed when a vehicle enters or exits a tunnel or when intense sunlight is shining directly in front of the vehicle.

In addition, since lane line information detected through two-dimensional image information needs to be converted into three-dimensional information, accurate range information may not be obtained in various road conditions, making it challenging to guarantee accurate perception results.

Therefore, the present disclosure provides a lane line detection method based on a lidar sensor for estimating an accurate position of a vehicle within a lane in a general driving situation and in a situation where other sensors fall into a perception error.

SUMMARY

In view of the above, the present disclosure provides a method for detecting a lane line of a lane on a road using a lidar sensor.

Technical objects to be achieved by the present disclosure are not limited to those described above, and other technical objects not mentioned above may also be clearly understood from the descriptions given below by those skilled in the art to which the present disclosure belongs.

In accordance with an aspect of the present disclosure, there is provided a method for detecting a lane line of a lane on a road using a lane detection device, the method including: obtaining, from a lidar sensor, point data by scanning the surroundings of the lidar sensor; detecting one or more lane line points constituting the lane line from among a plurality of points included in the point data using a threshold set based on a driving situation of a driving vehicle equipped with the lane detection device; and detecting the lane line using the one or more lane line points.

Further, the detecting of the one or more lane line points may include dividing the plurality of points into ground points constituting a ground and the lane line points by applying a Gaussian mixed model to the intensities of the plurality of points.

Further, the detecting of the one or more lane line points may further include setting a cell area having a predetermined size around the lane detection device or the lidar sensor, and the detecting of the one or more lane line points is performed only if the cell area is determined as a lane line cell that includes the lane line.

Further, the detecting of the one or more lane line points may further include applying a Gaussian mixed model to the intensities of points in the cell area; and determining the cell area as the lane line cell when skewness of the Gaussian mixed model is larger than or equal to a predetermined positive value.

Further, the detecting of the one or more lane line points may include generating a first plane using first points selected among the plurality of points; generating a second plane using second points selected among the plurality of points; and determining the first plane as a ground of a road when the number of first inlier points included in the first plane is larger than the number of second inlier points included in the second plane. The one or more lane line points are included in the first plane.

Further, the detecting of the lane line may include selecting lane line points within a predetermined distance from the lidar sensor among the one or more lane line points; generating a plurality of curves using at least a part of the selected lane line points; selecting, from the plurality of curves, a curve having the largest number of segments to which lane line points of which the distance from the corresponding curve is smaller than a predetermined value are assigned as a base lane line; and detecting, by using the base lane line, at least one of a lane line of a driving lane and a lane line of a neighboring lane for the driving vehicle equipped with the lane detection device.

Further, the detecting of at least one of the lane line of the driving lane and the lane line of the neighboring lane may be performed based on the curvature of the base lane line.

Further, the detecting of the lane line may further include removing points within a predetermined distance from the detected lane line; and detecting other lane lines using remaining points that are not removed.

In accordance with another aspect of the present disclosure, there is provided a lane detection system including: a lidar sensor to obtain point data by scanning the surroundings thereof; and a lane detection device to detect a lane line, the lane detection device including: a transceiver to receive point data from the lidar sensor; and a processor to control the transceiver. The processor may be configured to detect one or more lane line points constituting the lane line from among a plurality of points included in the point data using a threshold set based on a driving situation of a driving vehicle equipped with the lane detection device; and detect the lane line using the one or more lane line points.

In accordance with still another aspect of the present disclosure, there is provided a non-transitory computer-readable storage medium storing computer-executable instructions which cause, when executed by a processor, the processor to perform a method for detecting a lane line of a lane on a road using a lane detection device, the method including: obtaining, from a lidar sensor, point data by scanning the surroundings of the lidar sensor; detecting one or more lane line points constituting the lane line from among a plurality of points included in the point data using a threshold set based on a driving situation of a driving vehicle equipped with the lane detection device; and detecting the lane line using the one or more lane line points.

According to the embodiment of the present disclosure, since lane lines of a lane around the driving vehicle are detected using the lidar sensor, the position of a lane line of a lane on a road may be detected more accurately compared to the methods using a camera sensor.

Further, according to the embodiment of the present disclosure, the lane line points are extracted using a threshold set adaptively for a driving situation. Therefore, it is possible to accurately detect a lane line not only when driving in a general situation but also when driving under sudden illumination changes, driving during the day or at night, or driving in the rain.

Further, according to the embodiment of the present disclosure, the base lane line is used to detect the remaining lane lines to be detected. Therefore, an amount of computations for lane line detection may be significantly reduced.

BRIEF DESCRIPTION OF THE DRAWINGS

FIG. 10 is a flow chart showing a method for detecting the lane lines by the lane detection device according to the embodiment of the present disclosure.

DETAILED DESCRIPTION OF THE EMBODIMENTS

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
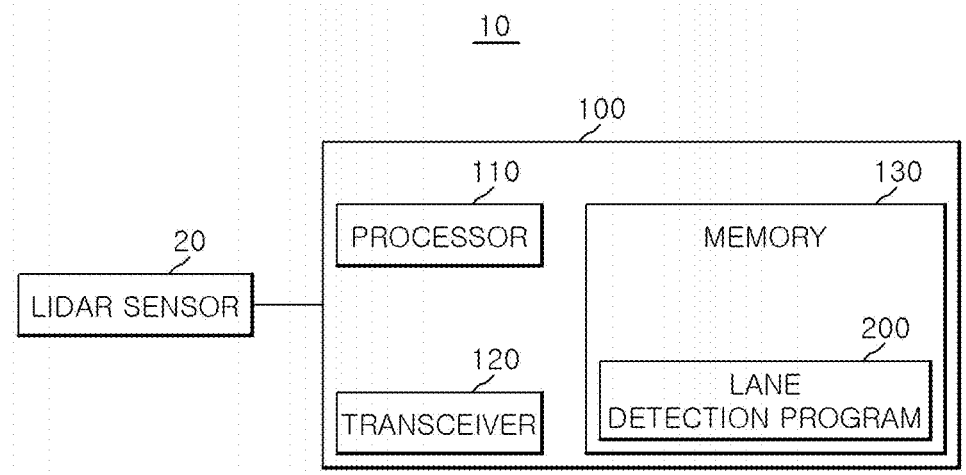
FIG. 1 is a block diagram showing an example of a lane detection system according to an embodiment of the present disclosure.

FIG. 1 is a block diagram showing an example of a lane detection system according to an embodiment of the present disclosure.

Referring to FIG. 1, the lane detection system 10 may include a lidar sensor 20 and a lane detection device 100.

In the present disclosure, for the sake of the convenience of description, a case where the lane detection system 10 is installed in a driving vehicle with which one or more lidar sensors are equipped (hereinafter, simply referred to as a vehicle) is mainly described. However, the present disclosure is not limited thereto, and the lane detection system 10 may be installed in an unmanned moving object such as a drone or other types of moving objects such as a vehicle, a motorcycle, a flight vehicle, and the like as well as the driving vehicle with the lidar sensors such as an autonomous vehicle.

In addition, in the present disclosure, a case where the lidar sensor 20 is provided separately from the lane detection device 100 to transmit point data to the lane detection device 100 is mainly described. However, the present disclosure is not limited thereto. For example, depending on embodiments, the lane detection device 100 may include the lidar sensor 20. In this case, the lidar sensor 20 may transmit the point data to a point data receiver 210 to be described later through internal signaling.

The lidar sensor 20 may emit a laser beam (light pulse) in a predetermined direction, for example, 360-degree directions including not only a direction in which the driving vehicle with the lane detection device 100 moves (forward direction) but also lateral and backward directions of the driving vehicle with the lane detection device 100. The lidar sensor 20 may receive a reflected (or backscattered) laser beam from surrounding terrain and objects, and the reflected laser beam may include one or more point data.

The lane detection device 100 may receive point data from the lidar sensor 20 and detect lane lines of a lane on a road around the lane detection device 100 (or the driving vehicle equipped with the lane detection device 100) using the received point data. Here, the lane line of the lane is indicated by a dashed (broken) line or a solid line to separate the lanes. For example, the lane line includes a center line, an edge line, and like on a road.

Specifically, the lane detection device 100 may detect the ground of a road using the received point data, extract lane line points corresponding to the lane line distinct from ground points corresponding to the ground among points included in the detected ground, and detect lane lines using the extracted lane line points. The lane lines may be tracked by associating the lane lines detected from a current frame with the lane lines detected in a previous frame.

In this connection, the lane detection device 100 may include a processor 110, a transceiver 120, and a memory 130.

The processor 110 may control the overall operation of the lane detection device 100.

The processor 110 may receive point data from the lidar sensor 20 through the transceiver 120.

In the present disclosure, a case where the lane detection device 100 receives the point data through the transceiver 120 is mainly described. However, the present disclosure is not limited thereto. In other words, depending on embodiments, the lane detection device 100 may include an input/output device (not shown) and receive the point data through the input/output device. Alternatively, for example, the lane detection device 100 may include the lidar sensor 20 to generate the point data in the lane detection device 100.

The memory 130 may store a lane detection program 200 and information used for executing the lane detection program 200.

In the present disclosure, the lane detection program 200 may indicate software including instructions programmed to detect lane lines of a lane on a road using point data.

To execute the lane detection program 200, the processor 110 may load the lane detection program 200 and information used for executing the lane detection program 200 from the memory 130.

Further, the processor 110 may execute the lane detection program 200 to detect lane lines around the lane detection device 100 using the received point data.

Functions and/or operations of the lane detection program 200 will be described in detail with reference to FIG. 2.

Figure 2:
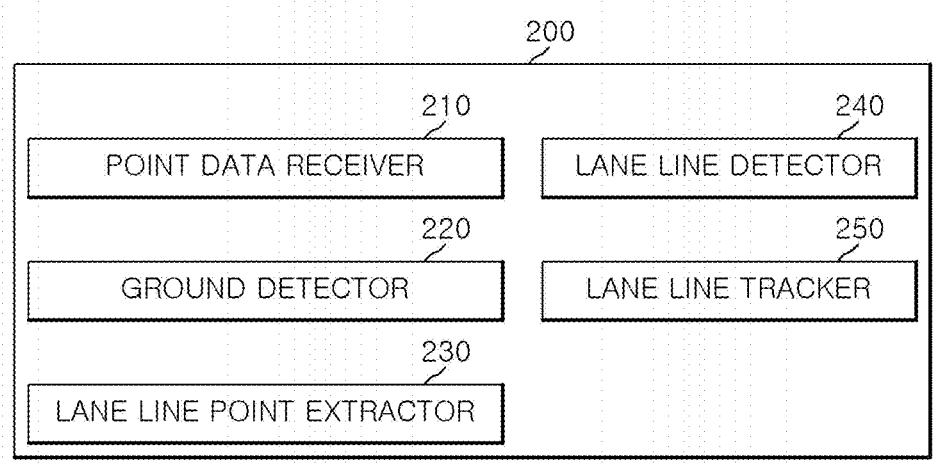
FIG. 2 is a block diagram illustrating functions of a lane detection program according to the embodiment of the present disclosure.

FIG. 2 is a block diagram illustrating functions of a lane detection program according to the embodiment of the present disclosure.

Referring to FIG. 2, the lane detection program 200 may include a point data receiver 210, a ground detector 220, a lane line point extractor 230, a lane line detector 240, and a lane line tracker 250.

In FIG. 2, the lane detection program 200 is conceptually divided into the point data receiver 210, the ground detector 220, the lane line point extractor 230, the lane line detector 240, and the lane line tracker 250 for easy understanding of the functions of the lane detection program 200. However, the present disclosure is not limited thereto. For example, depending on embodiment, the functions of the point data receiver 210, the ground detector 220, the lane line point extractor 230, the lane line detector 240, and the lane line tracker 250 may be integrated or separated or may be implemented using a series of instructions included in one program.

The point data receiver 210 may receive point data collected by the lidar sensor 20. The point data received by the point data receiver 210 may include a plurality of points.

Further, the ground detector 220 may detect the ground of a road using the received point data. Here, the ground of a road may indicate the road's surface (e.g., a ground surface on which the driving vehicle is located), excluding obstacles on or around the road.

Depending on embodiments, the ground detector 220 may detect the ground of a road using a plane fitting method.

Specifically, the ground detector 220 may select a predetermined number (for example, 4) of points among the received point data to generate a plane passing through the selected points ($ax+by+cz+d=0$).

Thereafter, the ground detector 220 may determine inlier points for the plane among points other than the points used to generate the plane. Here, inlier points may indicate points having perpendicular distances of equal to or smaller than a predetermined value from the generated plane.

The ground detector 220 may generate a plurality of planes by repeating the above process multiple times. Among the plurality of generated planes, the ground detector 220 may select a plane having the largest number of inlier points as the ground (road's surface) of the road.

The number of times the ground detector 220 repeats such a plane generation process is a preset value, which may be determined based on the number of points included in the received point data. For example, the number of times may represent the number of cases where a predetermined number (e.g., 4) of different points are selected among the points included in the received point data or may represent a preset value smaller than the number of cases.

Figure 3:
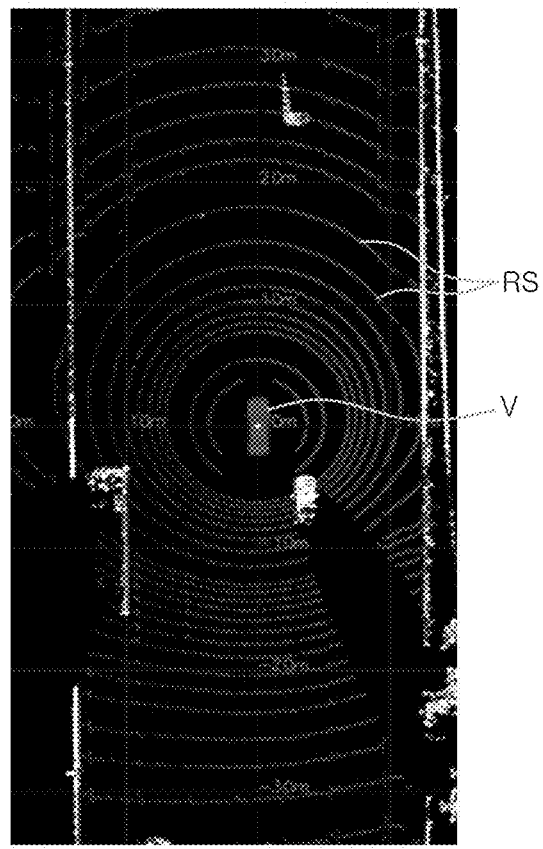
FIG. 3 shows an example in which a ground detector detects the ground of a road around a driving vehicle equipped with the lane detection device according to the embodiment of the present disclosure.

For example, referring to FIG. 3, FIG. 3 shows an example in which the ground detector 220 detects the ground of a road around a driving vehicle equipped with the lane detection device 100. The ground detector 220 may detect a ground RS around a driving vehicle V by performing a plane fitting method using received point data.

The lane line point extractor 230 may divide inlier points included in the plane selected as the ground of the road into ground points and lane line points by using the intensities of the inlier points. Since the reflectivity of a lane line is higher than that of the road surface (ground surface) other than the lane line, the ground points and the lane line points can be divided from the inlier points included in the plane selected as the ground of the road.

Here, the lane line points may indicate points constituting the lane line of the lane among the inlier points included in the ground of a road, and the ground points may indicate points other than the lane line points among the inlier points included in the ground of the road.

Specifically, the lane line point extractor 230 may extract the lane line points among the inlier points using a threshold set adaptively for a driving situation (based on the surrounding environment). In other words, the lane line point extractor 230 may compare the intensity of each of the inlier points with the adaptively set threshold and determine that an inlier point of which the intensity is larger than or equal to the threshold corresponds to the lane line point.

This operation is employed because, when lane line points are extracted using a single threshold value without considering various driving situations (that is, surrounding environment), the lane line points may not be extracted properly under the various driving situations.

Here, the various driving situations may include a situation where the illumination level shows a difference between driving during the day, at night, or in the rain or where the amount of illumination shows a rapid change at the time of entering a tunnel or due to shading by a structure or other vehicles.

Therefore, the lane line point extractor 230 may extract the lane line points using the threshold set adaptively in response to the various driving situations, which makes it possible to extract the lane line points robustly against the change of the driving situation.

Figure 4A:
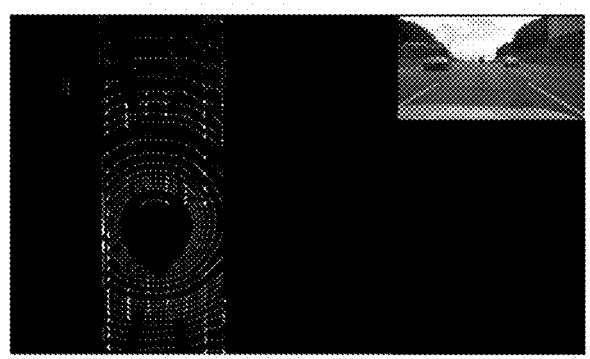
FIG. 4A shows an example of extracting lane line points using a threshold set adaptively according to driving conditions.
Figure 4B:
FIG. 4B shows an example of extracting lane line points using a threshold set adaptively according to driving conditions.
Figure 4C:
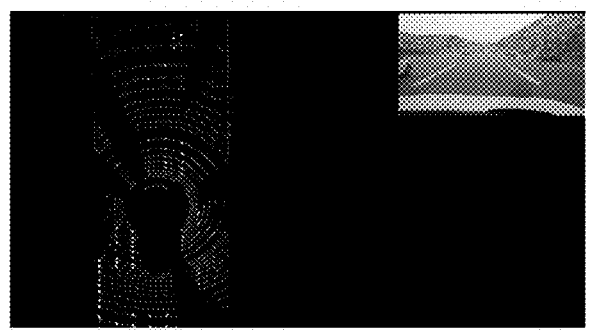
FIG. 4C shows an example of extracting lane line points using a threshold set adaptively according to driving conditions.

For example, referring to FIGS. 4A to 4C, FIG. 4A shows an example of extracting lane line points in a case when the lane line point extractor 230 sets the threshold to 10 as the driving vehicle equipped with the lane detection device 100 travels in the daytime. FIG. 4B shows an example of extracting lane line points in a case when the lane line point extractor 230 sets the threshold to 7 as the driving vehicle equipped with the lane detection device 100 travels at night. FIG. 4C shows an example of extracting lane line points when the lane line point extractor 230 sets the threshold to 5 as the driving vehicle equipped with the lane detection device 100 travels in the rain.

As shown in FIGS. 4A to 4C, the intensity of point data received by the lane detection device 100 may vary according to whether the driving vehicle equipped with the lane detection device 100 travels in the daytime, at night, and/or in the rain. Accordingly, the lane line point extractor 230 may extract lane line points more accurately by setting the threshold adaptively for various driving situations.

In the present disclosure, the case where the lane line point extractor 230 sets the threshold to 10 for driving in the daytime, 7 for driving at night, or 5 for driving in the rain is described above. However, the above case is merely an example, and the present disclosure is not limited thereto.

In order to set the threshold adaptively, the lane line point extractor 230 may set a cell area(s) of a predetermine size around the driving vehicle equipped with the lane detection device 100 (or the lidar sensor 20) and apply the Gaussian Mixture Model (GMM) to the set cell area.

In other words, when the GMM is applied to the inlier points belonging to one cell, the inlier points may be modeled by two mixed Gaussian distributions according to the difference between the intensity of the lane line point and the intensity of the ground point. The lane line point extractor 230 may determine the threshold by using the two mixed Gaussian distributions.

Figure 5:
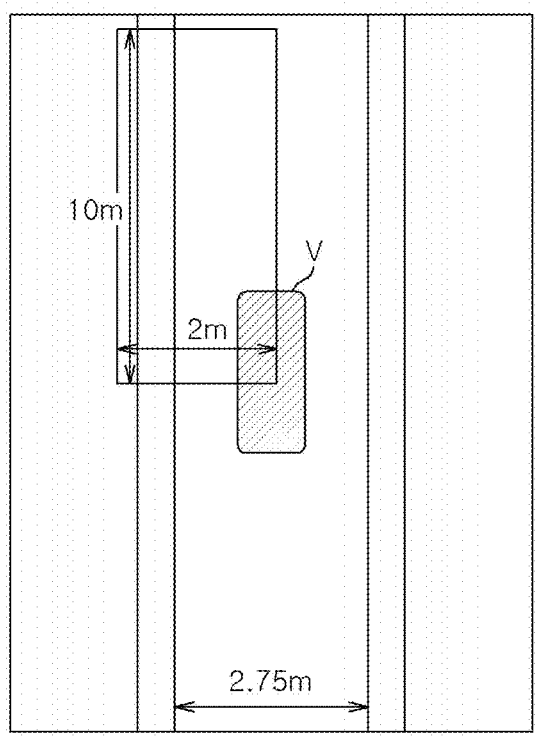
FIG. 5 shows an example of setting a cell area according to the embodiment of the present disclosure.

Here, the cell area may be determined based on at least one of a lane width and a lane line length. For example, referring to FIG. 5, the minimum lane width specified by the Korea road traffic authority is 2.75 meters, and the minimum lane line length is 10 meters. Accordingly, a cell area may be set to be 2 meters wide and 10 meters long.

Further, the lane line point extractor 230 may determine whether a set cell area is a lane line cell that include lane line points or a ground cell that do not have the lane line points. Then, the lane line point extractor 230 may perform the lane line point extraction described above only when the set cell area is determined as the lane line cell.

Here, the lane line cell may indicate a cell area that includes a lane line, and the ground cell may indicate a cell area that does not have a lane line therein. Since the ground cell does not have the lane line within its area, when lane line point extraction is performed on the ground cell, a problem may arise that a ground point is extracted as a lane line point.

Therefore, the lane line point extractor 230 may apply the Gaussian model to the inlier points belonging to the set cell area to avoid the problem described above. When skewness of the Gaussian model is larger than or equal to a predetermined value (for example, 3), the lane line point extractor 230 may determine the set cell area as the lane line cell.

Figure 6A:
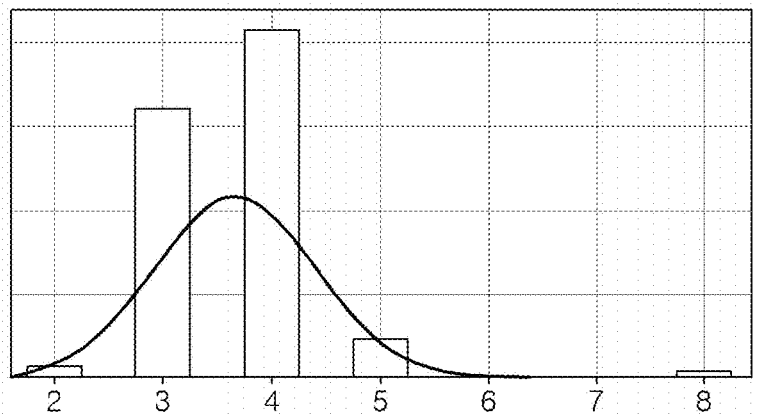
FIG. 6A shows an example of Gaussian models for a ground cell according to the embodiment of the present disclosure.
Figure 6B:
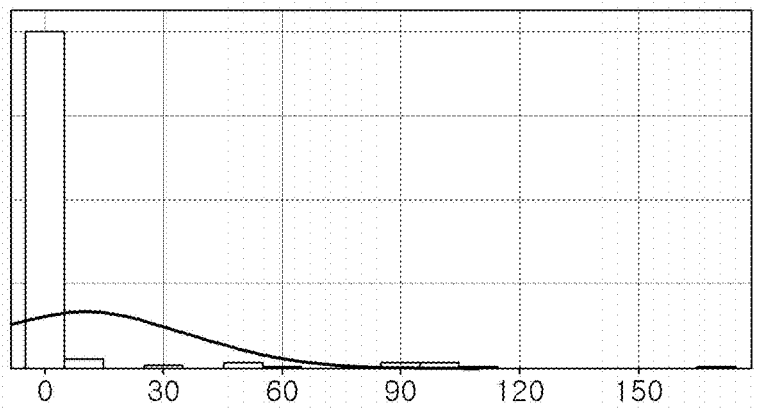
FIG. 6B shows an example of Gaussian models for a lane line cell according to the embodiment of the present disclosure.

For example, referring to FIGS. 6A and 6B, FIG. 6A shows an example of the Gaussian model for the ground cell, and FIG. 6B shows an example of the Gaussian model for the lane line cell.

In the case of FIG. 6A, since data is more concentrated in the left of the Gaussian model (that is, since very little point data show significant intensity), the skewness of the Gaussian model is less than the predetermined value (for example, a value close to 0). Therefore, the lane line point extractor 230 may determine the corresponding cell area as the ground cell and not perform the lane line point extraction.

On the other hand, in the case of FIG. 6B, since data is more concentrated in the right of the Gaussian model (that is, since point data with significant intensity exist), the skewness of the Gaussian model is larger than or equal to the predetermined value. Therefore, the lane line point extractor 230 may determine the corresponding cell area as the lane line cell and perform the lane line point extraction.

Figure 7:
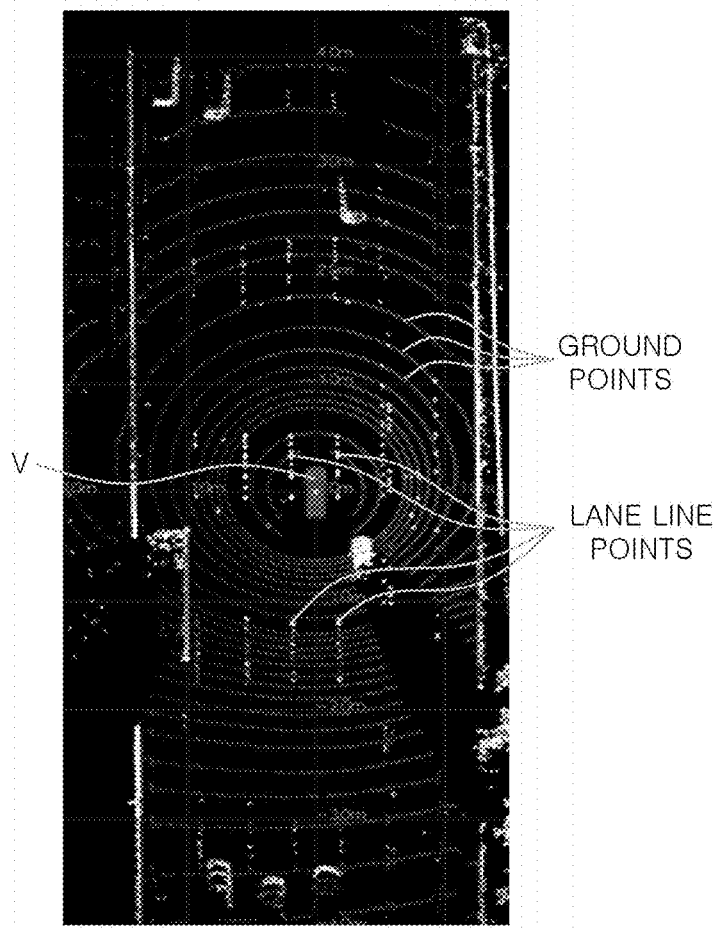
FIG. 7 shows an example of a result of extracting lane line points around the driving vehicle equipped with the lane detection device according to the embodiment of the present disclosure.

Further, referring to FIG. 7, FIG. 7 shows a result of extracting lane line points by the lane line point extractor 230 around a driving vehicle V equipped with the lane detection device 100.

As described above, the lane line point extractor 230 may set a threshold adaptively by applying the Gaussian mixed model to a set cell area when the set cell area is determined as the lane line cell. Then, the lane line point extractor 230 may determine, among inlier points included in the corresponding set cell area, inlier points whose intensity is larger than or equal to the adaptively set threshold as lane line points. As shown in FIG. 7, the lane line point extractor 230 may clearly extract lane line points from neighboring ground points through the operation above.

The lane line detector 240 may detect lane lines of a lane on a road using the lane line points extracted by the lane line point extractor 230.

More specifically, the lane line detector 240 may first set a base lane line to detect lane lines.

Here, a base lane line may indicate the most accurate lane line that can be detected using extracted lane line points. As the distance from the lidar sensor 20 increases, the reflectivity and density of inlier points included in the point data decreases. Therefore, as close as possible to the lidar sensor 20, more lane line points are observed, and thus, position accuracy based on the points may be high.

Therefore, the lane line detector 240 may first detect the base lane line with the highest accuracy and then detect other lane lines based on the base lane line.

Depending on embodiments, in order to detect the base lane line, the lane line detector 240 may select lane line points within a predetermined distance from the lidar sensor 20 among extracted lane line points. Depending on embodiments, the predetermined distance may be a value corresponding to the lane width. For example, the predetermined distance may be 3.5 m, which corresponds to the width of a general lane in Republic of Korea.

The lane line detector 240 may select a predetermined number (for example, 4) of points among the selected lane line points to generate a third-order curve ($ax^3+bx^2+cx+d=0$) and select lane line points of which the distance from the generated third-order curve (for example, a normal (perpendicular) distance) is smaller than or equal to a preset value.

The lane line detector 240 may assign the selected lane line points of which the distance from the generated third-order curve is smaller than or equal to the preset value to segments divided by a predetermined distance and count the number of segments to which one or more lane line points are assigned.

Figure 8:
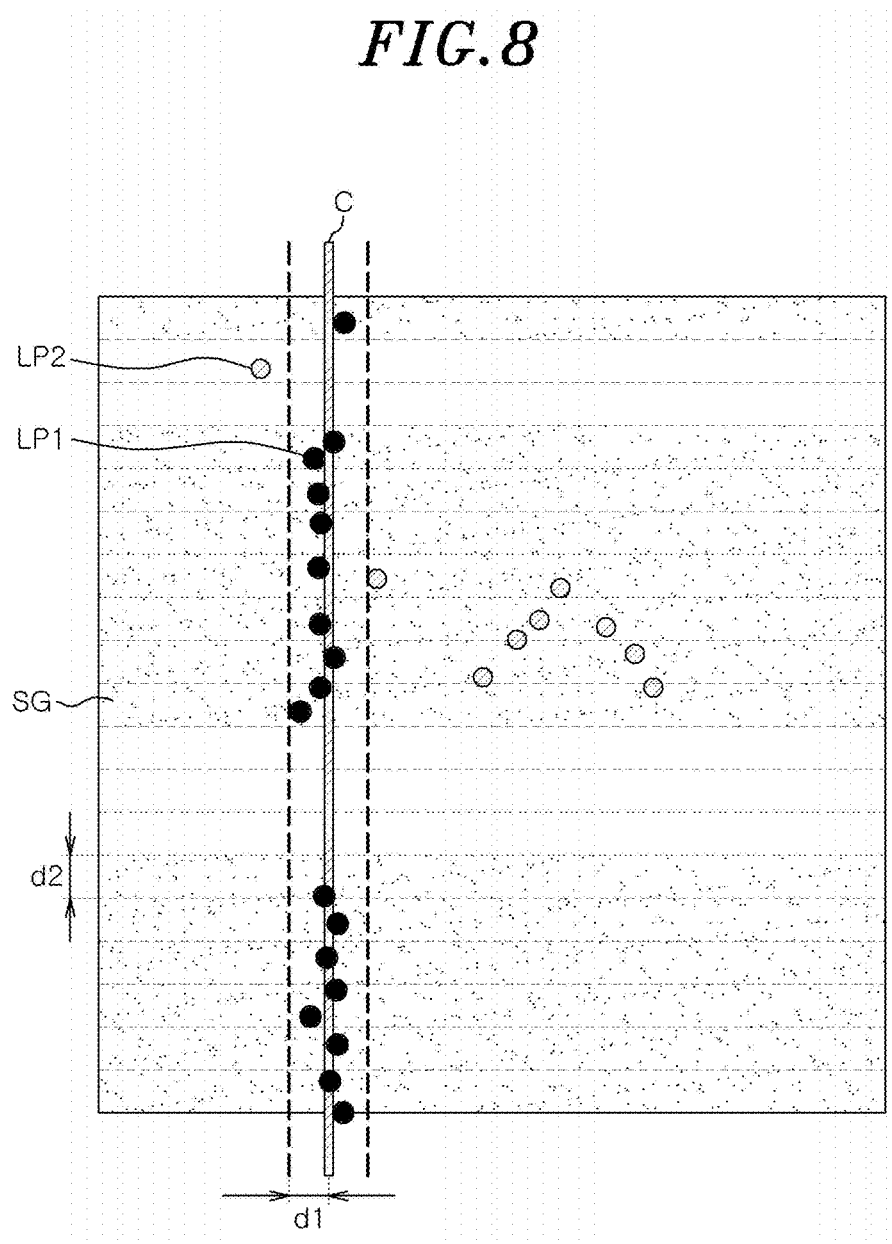
FIG. 8 shows a method for calculating the number of segments to which one or more lane line points are assigned by a lane line detector according to the embodiment of the present disclosure.

For example, referring to FIG. 8, the lane line detector 240 may select 18 lane line points (LPs) of which a distance d1 from the third-order curve C is smaller than or equal to a preset value among 27 selected lane line points located within a predetermined distance from the liar sensor 20. Thereafter, the lane line detector 240 may assign the selected lane line points (LPs) to the segments SG divided by a predetermined distance d2 and count the number (14) of segments SG to which one or more lane line points (LPs) are assigned.

The lane line detector 240 may perform a series of operations from the generation of the third-order curve to the counting of the number of segments multiple times and select, among a plurality of third-order curves, a third-order curve that satisfies a predetermined criterion and provides the largest number of segments as the base lane line.

The predetermined criterion is used to define a curve as the lane line. That is, the criterion is used to calculate a lane line length by multiplying the number of segments by a predetermined distance according to which segments are assigned and to determine whether the calculated length is greater than or equal to a predetermined value. Therefore, the lane line detector 240 may determine the base lane line only when the length of a third-order curve having the largest number of segments is greater than or equal to a predetermined value.

The lane line detector 240 may detect lane lines of a driving lane and lane lines of neighboring lanes using the detected base lane line. Here, a lane line of the driving lane may indicate a line of a driving lane on which the driving vehicle equipped with the lane detection device 100 travels, and a lane line of the neighboring lane may indicate a line of a lane neighboring the driving lane, which extends in parallel in the same direction as the driving lane.

More specifically, the lane line detector 240 may detect a lane line of the driving lane and a lane line of the neighboring lane by searching for lane lines having the same curvature as the detected base lane line. The above operation is performed since the curvature of the lane line of the driving lane is generally the same as that of the lane line of the neighboring lane. With the above operation, the amount of computations may be significantly reduced.

While shifting of the position of the base lane line by the predetermined distance, the lane line detector 240 may determine whether the position distanced from the base lane line by the predetermined distance corresponds to a lane line (a lane line of a driving lane or a lane line of a neighboring lane) by using the same method used to detect the base lane line.

In other words, the lane line detector 240 may count the number of segments to which lane line points are assigned at the position distanced from the base lane line by the predetermined distance. Then, according to a comparison result between the number of segments having the lane line points at the position and the number of segments having the lane line points for the base lane line, the lane line detector 240 may determine that the position corresponds to a lane line.

For example, when the number of segments having the lane line points at the position is greater than or equal to a predetermined percentage of the number of segments having the lane line points for the base lane line, the lane line detector 240 may determine that the position corresponds to a lane line.

When the lane line is detected, the lane line detector 240 may remove points located within a predetermined distance (normal (perpendicular) distance) from the detected lane line and, then, detect a lane line of the driving lane or a lane line of the neighboring lane by performing the above-described lane line detection process again on the remaining points. The above operation is performed because lane lines adjacent to one lane line are separated by a distance that allows the driving vehicle to pass. Therefore, the lane line detector 240 may remove points located within a predetermined distance corresponding up to the maximum width of the driving vehicle from the detected lane line since those points are not lane line points. Then, the lane line detector 240 additionally detects a lane line of the neighboring (adjacent) lane by performing the lane line detection process again on the remaining points. Thus, the computational burden may be reduced.

Figure 9:
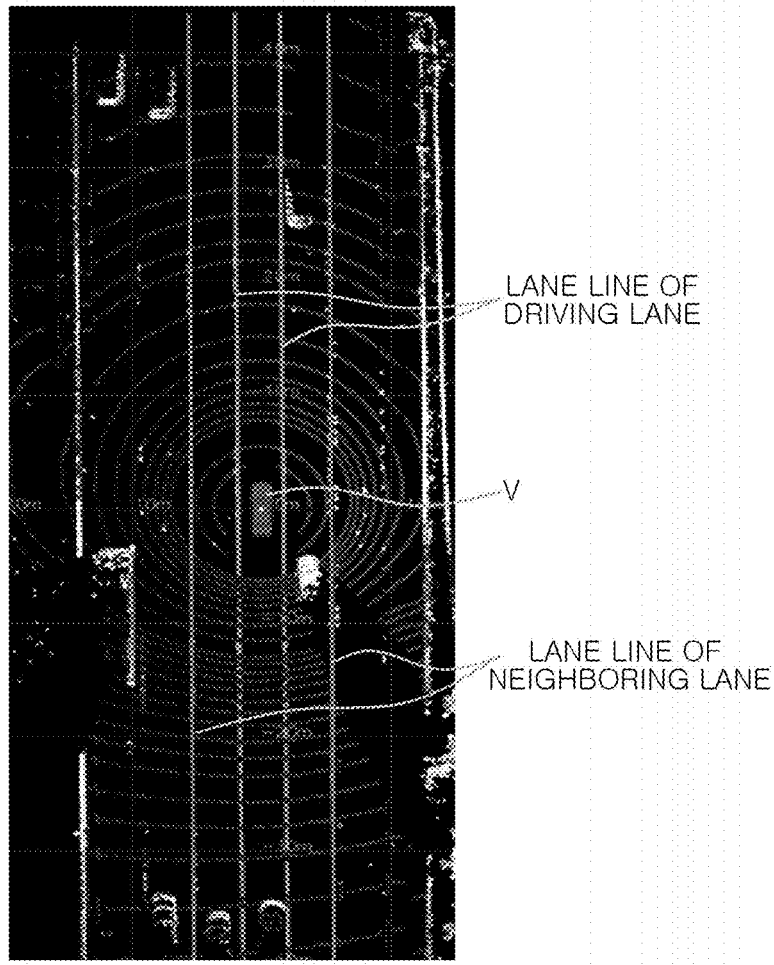
FIG. 9 shows an example of a lane line detected by a lane line detector according to the embodiment of the present disclosure.

For example, referring to FIG. 9, FIG. 9 shows an example of a lane line detection result obtained from the lane line detector 240. The lane line detector 240 may detect at least one of the lane line of the driving lane and the lane line of the neighboring lane using the base lane line, identify at least one among the detected lane lines of the driving lane and the neighboring lane, and output the identified lane line.

The lane line tracker 250 may track the lane lines (the lane lines of the driving lane and the lane lines of the neighboring lanes) detected by the lane line detector 240 to determine whether the lane line detected by a current process and the lane line detected by a previous process are included in one lane line.

More specifically, the lane line tracker 250 may associate the lane lines detected by the current process with the lane lines detected by the previous process based on the curvature and position information of the lane lines detected by the current process. Then, the lane line tracker 250 may determine whether the associated lane lines (the lane line of the current process and the lane line of the previous process) are one lane line by removing noise in the lane line association result using a Kalman filter.

FIG. 10 is a flow chart showing a method for detecting the lane lines by the lane detection device according to the embodiment of the present disclosure.

Referring to FIGS. 1, 2, and 10, when the point data receiver 210 receives (obtains) point data including a plurality of points from the lidar sensor 20 (step S1000), the ground detector 220 may detect the ground of a road by applying a plane fitting method to the received point data (step S1010).

Thereafter, the lane line point extractor 230 may extract lane line points among inlier points included in the ground of the road by using a cell area and an adaptive threshold (step S1020).

The lane line detector 240 may set a base lane line using the extracted lane line points and detect lane lines based on the base lane line (step S1030).

The lane line tracker 250 may track detected lane lines (the lane lines of the driving lane and the lane lines of the neighboring lanes) and determine whether the lane line detected by a previous process and the lane line detected by a current process are included in the one lane line (step S1040).

According to the embodiment of the present disclosure, since the lane lines around the driving vehicle are detected using the lidar sensor, the position of a lane line may be detected more accurately compared to the methods using a camera sensor.

Further, according to the embodiment of the present disclosure, the lane line points are extracted using a threshold set adaptively for a driving situation. Therefore, it is possible to accurately detect a lane line not only when driving in a general situation but also when driving under sudden illumination changes, driving during the day or at night, or driving in the rain.

Further, according to the embodiment of the present disclosure, the base lane line is used to detect the remaining lane lines to be detected. Therefore, an amount of computations for lane line detection may be significantly reduced.

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A method for detecting a lane line of a lane on a road using a lane detection device mounted on a moving vehicle on the road and for positioning the moving vehicle within the lane, the method comprising:

obtaining, from a LIDAR sensor mounted on the moving vehicle, point data by scanning surroundings of the LIDAR sensor;

detecting one or more lane line points constituting the lane line from among a plurality of points included in the point data using a threshold that is set adaptively in response to a plurality of driving situations including a time period when the moving vehicle is on the road in terms of daytime or nighttime, a weather condition when the moving vehicle is on the road, and an amount of illumination when the moving vehicle is on the road;
detecting the lane line using the one or more lane line points; and
estimating the moving vehicle's position in relation to the detected lane line.

2. The method of claim 1, wherein the detecting of the one or more lane line points includes:
dividing the plurality of points into ground points constituting a ground and the lane line points by applying a Gaussian mixed model to intensities of the plurality of points.

3. The method of claim 1, wherein the detecting of the one or more lane line points includes:
setting a cell area having a predetermined size around the lane detection device or the LIDAR sensor, and
the detecting of the one or more lane line points is performed only if the cell area is determined as a lane line cell that includes the lane line.

4. The method of claim 3, wherein the detecting of the one or more lane line points further includes:
applying a Gaussian mixed model to intensities of points in the cell area; and
determining the cell area as the lane line cell when skewness of the Gaussian mixed model is larger than or equal to a predetermined positive value.

5. The method of claim 1, wherein the detecting of the one or more lane line points includes:
generating a first plane using first points selected among the plurality of points;
generating a second plane using second points selected among the plurality of points; and
determining the first plane as a ground of a road when the number of first inlier points included in the first plane is larger than the number of second inlier points included in the second plane,
wherein the one or more lane line points are included in the first plane.

6. The method of claim 1, wherein the detecting of the lane line includes
selecting lane line points within a predetermined distance from the LIDAR sensor among the one or more lane line points;
generating a plurality of curves using at least a part of the selected lane line points;
selecting, from the plurality of curves, a curve having the largest number of segments to which lane line points of which the distance from a corresponding curve is smaller than a predetermined value are assigned as a base lane line; and
detecting, by using the base lane line, at least one of a lane line of a driving lane and a lane line of a neighboring lane for the moving vehicle equipped with the lane detection device.

7. The method of claim 6, wherein the detecting of at least one of the lane line of the driving lane and the lane line of the neighboring lane is performed based on a curvature of the base lane line.

8. The method of claim 1, wherein the detecting of the lane line includes:
removing points within a predetermined distance from the detected lane line; and
detecting other lane lines using remaining points that are not removed.

9. A lane detection system for detecting a lane line of a lane on a road using a lane detection device mounted on a moving vehicle on the road and for positioning the moving vehicle within the lane, comprising:
a LIDAR sensor mounted on the moving vehicle to obtain point data by scanning surroundings of the moving vehicle; and
a lane detection device mounted on the moving vehicle to detect the lane line, the lane detection device including:
a transceiver to receive point data from the LIDAR sensor; and
a processor to control the transceiver,
wherein the processor is configured to
detect one or more lane line points constituting the lane line from among a plurality of points included in the point data using a threshold that is set adaptively in response to a plurality of driving situations including of a time period when the moving vehicle is on the road in terms of daytime or nighttime, a weather condition when the moving vehicle is on the road, and an amount of illumination when the moving vehicle is on the road;
detect the lane line using the one or more lane line points; and
estimate the moving vehicle's position in relation to the detected lane line.

10. A non-transitory computer-readable storage medium storing computer-executable instructions which cause, when executed by a processor, the processor to perform a method for detecting a lane line of a lane on a road using a lane detection device mounted on a moving vehicle on the road and for positioning the moving vehicle within the lane, the method comprising:
obtaining, from a LIDAR sensor mounted on the moving vehicle, point data by scanning surroundings of the LIDAR sensor;
detecting one or more lane line points constituting the lane line from among a plurality of points included in the point data using a threshold that is set adaptively in response to a plurality of driving situations including a time period when the moving vehicle is on the road in terms of daytime or nighttime, a weather condition when the moving vehicle is on the road, and an amount of illumination when the moving vehicle is on the road;
detecting the lane line using the one or more lane line points; and
estimating the moving vehicle's position in relation to the detected lane line.

11. The non-transitory computer-readable storage medium of claim 10, wherein the detecting of the one or more lane line points includes dividing the plurality of points into ground points constituting a ground and the lane line points by applying a Gaussian mixed model to intensities of the plurality of points.

12. The non-transitory computer-readable storage medium of claim 10, wherein the detecting of the one or more lane line points includes setting a cell area having a predetermined size around the lane detection device or the LIDAR sensor, and the detecting of the one or more lane line points is performed only if the cell area is determined as a lane line cell that includes the lane line.

13. The non-transitory computer-readable storage medium of claim 12, wherein the detecting of the one or more lane line points further includes applying a Gaussian mixed model to intensities of points in the cell area; and determining the cell area as the lane line cell when skewness of the Gaussian mixed model is larger than or equal to a predetermined positive value.

14. The non-transitory computer-readable storage medium of claim 10, wherein the detecting of the one or more lane line points includes:
   generating a first plane using first points selected among the plurality of points;
   generating a second plane using second points selected among the plurality of points; and
   determining the first plane as a ground of a road when the number of first inlier points included in the first plane is larger than the number of second inlier points included in the second plane,
   wherein the one or more lane line points are included in the first plane.

15. The non-transitory computer-readable storage medium of claim 10, wherein the detecting of the lane line includes:
   selecting lane line points within a predetermined distance from the LIDAR sensor among the one or more lane line points;
   generating a plurality of curves using at least a part of the selected lane line points;
   selecting, from the plurality of curves, a curve having the largest number of segments to which lane line points of which the distance from a corresponding curve is smaller than a predetermined value are assigned as a base lane line; and
   detecting, by using the base lane line, at least one of a lane line of a driving lane and a lane line of a neighboring lane for the moving vehicle equipped with the lane detection device.

16. The non-transitory computer-readable storage medium of claim 15, wherein the detecting of at least one of the lane line of the driving lane and the lane line of the neighboring lane is performed based on a curvature of the base lane line.

17. The non-transitory computer-readable storage medium of claim 10, wherein the detecting of the lane line includes:
   removing points within a predetermined distance from the detected lane line; and
   detecting other lane lines using remaining points that are not removed.

* * * * *